J. LAWSON.
LOCKABLE STEERING WHEEL FOR MOTOR VEHICLES.
APPLICATION FILED APR. 12, 1920.
1,383,550.
Patented July 5, 1921.
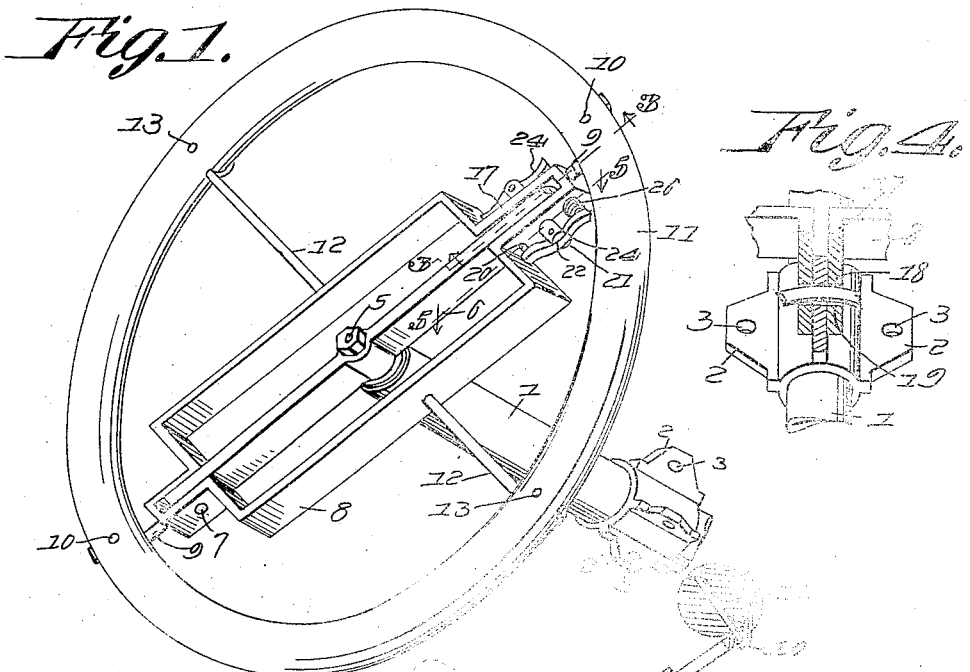
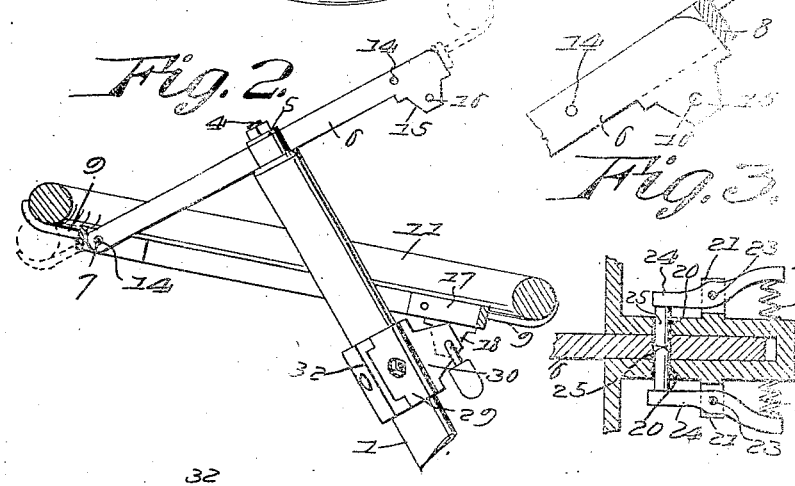
Inventor
John Lawson,
By Watson E. Coleman
Attorney

UNITED STATES PATENT OFFICE.

JOHN LAWSON, OF MANITO, ILLINOIS.

LOCKABLE STEERING-WHEEL FOR MOTOR-VEHICLES.

1,383,550.                Specification of Letters Patent.         Patented July 5, 1921.

Application filed April 12, 1920. Serial No. 373,245.

*To all whom it may concern:*

Be it known that I, JOHN LAWSON, a citizen of the United States, residing at Manito, in the county of Mason and State of Illinois, have invented certain new and useful Improvements in Lockable Steering-Wheels for Motor-Vehicles, of which the following is a specification, reference being had to the accompanying drawings.

This invention relates to an improved steering wheel and a lock therefor, and an object is to provide a lockable steering wheel which is pivotally mounted upon a supporting bar movable with the steering rod, which is in the steering column, in combination with means for locking the wheel in lowered position, or in a raised operative position.

Another object is to provide a wheel so pivotally and operatively supported on the steering rod within the column as to permit the wheel to be tilted downwardly, in conjunction with means for locking the wheel to the column, which is in surrounding relation to the steering rod.

Still another object embodies a yoke or loop frame which supports the steering wheel rim pivotally and operatively mounted on a supporting bar at one end of the yoke or loop frame, the other end of the loop or yoke frame having means to be latched operatively to one end of the supporting bar, whereby the wheel may be operated, or locked in an inoperative position to the column in a tilted position, and being that the column is stationary, the steering wheel is prevented from being rotated for the purpose of steering the front wheels of a motor vehicle.

A further object contemplates the provision of improved means integrally or detachably carried by the steering column and when detachably carried by the column it is possible to apply the improved steering wheel and lock therefor to any make of automobile now in use.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of a portion of a steering column, and showing the improved steering wheel and lock therefor as applied, showing the wheel in an operative position, Fig. 2 is a sectional view through the steering wheel, showing the same tilted, and illustrating how the wheel is locked in an inoperative position, Fig. 3 is a cross sectional view on line 3—3 of Fig. 1, Fig. 4 is a detail view of a portion of the steering column showing the parts 17 as straddling one of the lugs 2 which is fixed on the steering column and showing a portion of the shackle of the padlock as engaging through the parts 17 and the lug in order to lock the steering wheel in a tilted position, Fig. 5 is a sectional view on line 5—5 of Fig. 1 at right angles to that of Fig. 3, Fig. 6 is a detail sectional view through the steering column showing a modified construction of mounting the lugs on the column by means of a band 29.

Referring more especially to the drawings, 1 designates a conventional form of steering column, which in Fig. 1 carries a plurality of radial lugs 2 provided with apertures 3, and 4 denotes the steering rod which passes through the column. Fixed at 5 on the upper end of the steering rod is a transverse bar 6 to one end of which as shown at 7, a loop or yoke frame 8 is pivotally mounted. The opposite ends of this loop or yoke frame are provided with extensions 9 which are bolted or otherwise secured at 10 to the rim 11 of the steering wheel. Fixed to and extending laterally of the sides of the yoke or loop frame are rods 12 which are bolted or otherwise fastened at 13 to the rim of the steering wheel. It will be noted that the yoke or loop frame together with the lateral rods, rod extensions and the rim constitute the steering wheel, which is pivotally mounted upon the supporting bar which in turn is carried by the steering rod which is inclosed in the steering column.

The transversely disposed supporting bar 6 has an aperture 14 at one end, and a downwardly projecting lug 15 which is also provided with an aperture 16. The opposite ends of the yoke or loop frame are provided with contract parts 17, the parallel sides of one of which has downwardly projecting parallel lugs 18. These lugs 18 have apertures 19 which are in registration. The parallel sides of one of the contracted ends of the loop or yoke frame have registering apertures 20, which are designed to register with the aperture 14 when the steering wheel is in a raised operative position. Projecting from the sides of one of the contracted ends of the yoke or loop frame are posts or lugs 21 which are bifurcated as shown at 22. Pivotally mounted in the bifurcations of the lugs 21 on the pins 23 are dogs 24. The noses 25 of the dogs engage through the apertures 20 and are designed to also protrude into the apertures 14 of one end of the supporting bar to hold the steering wheel in a raised operative position.

The tail ends of the dogs have interposed between them and the sides of the contracted end portions of the yoke or loop frame, expansible coil springs 26 which act to hold the noses of the dogs normally engaging the aperture 14 from opposite sides of one end of the supporting bar. When the wheel is so disposed as shown in Fig. 1, the wheel may be very easily manipulated by the operator or chauffeur for steering the front wheels of the motor vehicle.

However, when it is desired to lock the steering wheel, and prevent the same from being manipulated, the dogs may be extended against the tension of the expansible spring to remove the noses from the apertures 14. The steering wheel may then be tilted on its pivot, whereby the spaces between the opposite sides of one of the contracted ends of the yoke or loop frame may receive either one of the lugs 2 of the steering column, so that the aperture 3 may register with the registering apertures 19 of the downwardly projecting lugs 18, after which the shackle of a suitable padlock 28 or the like may be passed through said registering apertures to prevent the steering wheel from being restored to its normal position, and thereby prevent the operating of the steering wheel.

In Fig. 2 and the transverse view of the steering column there is illustrated a detachable band 29, carrying the apertured lugs 30, which is in engagement with the column, in fact, this band surrounds the column and carries a socket 31 on one end of the band, which may be any suitable shape, preferably rectangular, and which is designed to receive a correspondingly shaped enlargement 32 on the other end of the band. This improved band is in surrounding relation to the column, whereby the enlargement 32 may engage said socket, there being screws passing through the member having the socket and are threaded into the enlargement 32 of the other end of the band, thereby tightly securing the band on the column. However, the band is capable of being detached simply by removing the screws, and permitting the steering wheel to be removed. It is to be noted that the stationary lugs may be used or the band which is detachable including the lugs 30 may be employed.

In this latter case it is obvious that the band is capable of fitting any make or construction of steering column so that a lockable steering wheel of the present character may be applied to motor driven vehicles of the various characters, even limousines and heavy touring automobiles, or trucks, preferably the latter, thereby preventing the steering wheel from being removed or manipulated as the case may be.

It will be noted that the steering wheel can be tilted and locked to the steering column regardless of the position of the steering wheel relatively to the column. This is due to the fact that the lugs 2 or the lugs 30 extend from the steering column at different radial positions. In tilting and locking the wheel it is the aim to aline the parts 17 so as to straddle any one of the lugs 2 or the lugs 30 in order to lock the wheel.

The invention having been set forth, what is claimed as new and useful is:—

1. The combination with a steering column including a steering rod inclosed therein, of a support fixed to the upper end of said rod, a steering wheel including a frame pivotally mounted on one end of said support, the other end of the frame having a contracted portion provided with opposite sides, spring tensioned means carried by the opposite sides and protruding therethrough and into engagement with one end of the support to hold the wheel in an operative position, the parallel sides of said extension of the frame having depending portions, and means carried by the column engaging between said depending portions, and means connecting the depending portions to the means carried by the column thereby locking the wheel in an inoperative position.

2. In a device as set forth, a steering column provided with lateral radial projections and including a steering rod inclosed in the column, a support on the upper end of said rod, a steering wheel pivoted on one end of said support and adapted to be supported in an operative position, or in an inoperative position, said steering wheel including a frame having at one end a contracted extension having parallel parts between which one end of said support engages, means extending through the parallel parts of said extension and through one end of the support for locking the wheel in a raised operative position, and means adapted to pass through the parallel projections of one contracted end of the frame of the wheel and through one of the projections on the column for holding the wheel in a downward tilted inoperative position.

In testimony whereof I hereunto affix my signature.

JOHN LAWSON.